United States Patent [19]
Burton

[11] Patent Number: 4,931,662
[45] Date of Patent: Jun. 5, 1990

[54] WAVE ENERGY SYSTEM

[76] Inventor: Lawrence C. Burton, 1310 East Section, Apt. 3, Mount Vernon, Washington, 98273.

[21] Appl. No.: 319,926

[22] Filed: Mar. 6, 1989

Related U.S. Application Data

[63] Continuation of Ser. No. 148,646, Jan. 26, 1988, abandoned.

[51] Int. Cl.$^5$ ............................................. F03B 13/12
[52] U.S. Cl. ...................................... 290/42; 290/53; 60/507
[58] Field of Search .......................................... 290/53

[56] References Cited

U.S. PATENT DOCUMENTS

| | | | |
|---|---|---|---|
| 827,639 | 7/1906 | Hutchings | 60/504 |
| 870,706 | 11/1907 | Woodward | 60/504 |
| 4,317,047 | 2/1982 | DeAlmada | 290/53 |
| 4,418,286 | 11/1983 | Scott | 290/42 |

FOREIGN PATENT DOCUMENTS 171081 10/1982 Japan ........................................ 290/53

OTHER PUBLICATIONS

138590, "Drawings Only", 9/20, United Kingdom, Beccari.

Primary Examiner—Bernard Roskoski
Attorney, Agent, or Firm—Head & Johnson

[57] ABSTRACT

A machine for converting ocean wave energy to electrical energy. A long rigid beam is supported intermediate the ends by a pivot which is supported from the earth by a platform. One end of the beam extends outwardly toward the ocean. A circular float is supported from the outer end of the beam by a universal joint. The inner end of the beam at the end opposite the float is a connection to hydraulic or fluid pumps which produces hydraulic fluid or fluids under pressure in response to the wave motion on the float. This power, hydraulic fluid or fluids drives an electrical generator.

4 Claims, 7 Drawing Sheets

WAVE ENERGY SYSTEM

This is a continuation of application Ser. No. 07/148646 filed 01/26/88 now abandoned.

BACKGROUND OF THE INVENTION

This invention relates to harnessing the motion of waves to produce electrical energy.

It has long been recognized that the motion of waves on the surface of a body of water such as the ocean offers a potential for the generation of tremendous amounts of power. Many structures have been proposed to accomplish this purpose. What they do is to try to convert the motion of the waves to a power generator unit typically so electrical power can be generated. Some power generating units may include a pump for pumping water or other hydraulic fluid and then using a hydraulic turbine to turn an electrical power generator. Some of the drawbacks to some of the present day structures have been their complexities, particularly with respect to the linkages by means of which the float is coupled to the power generating unit. Generally they are also directed to having waves coming from a single direction.

SUMMARY OF THE INVENTION

This is a device for generating electrical energy from wave motion. A platform supported by the earth extends above the high water line. The platform supports a pivot and a hydraulic or fluid pump means. A long rigid beam is supported by said pivot and is connected at its inner end to the hydraulic or fluid pump to drive it. The outer end of the rigid beam supports a float through a universal joint. The float is circular in shape and generally is like a short fat cylinder.

This apparatus is designed primarily for operation on reefs which has a top portion which is in relatively shallow water adjacent a cliff or sudden dropoff which separates the shallow water of the edge of the reef from deep water. The beam extends over this deep section of water.

The round shape of the float and the universal connection to the end of the beam permits the device to function quite well even though the direction from which the waves come varies as much as 180°.

Another embodiment of my invention is made especially for those environments in which there is an essentially vertical cliff adjacent the water. In those case a vertical member is secured to the cliff and the lower end of the vertical member supports the long rigid beam. The long vertical support member supports a hydraulic or fluid pump means which is operable by movement of the float and the long rigid member.

This wave energy system will be increased if one has the resonant system tuned to the frequency of the waves. In one embodiment there are shown ways of changing the mass and its location such as changing the ballast of the float or having an adjustable ballast car slidably mounted on the long, rigid beam. Means are also provided so that if the wind velocity gets too high that the power float is automatically lifted out and locked at pivot arms for duration of the wind velocity. A wave height sensor is also provided which if the wave height exceeds a predetermined set point then the float is automatically lifted out of the water and locked into pivot arms for the duration of the period in which the wave height is excessive.

It is therefore an object of this invention to provide an apparatus for generating power from ocean waves. It is a further object of the invention to provide an apparatus which extends out over deep water and which can function even though the direction of the waves may change considerably.

DETAILED DESCRIPTION

Figure 1:
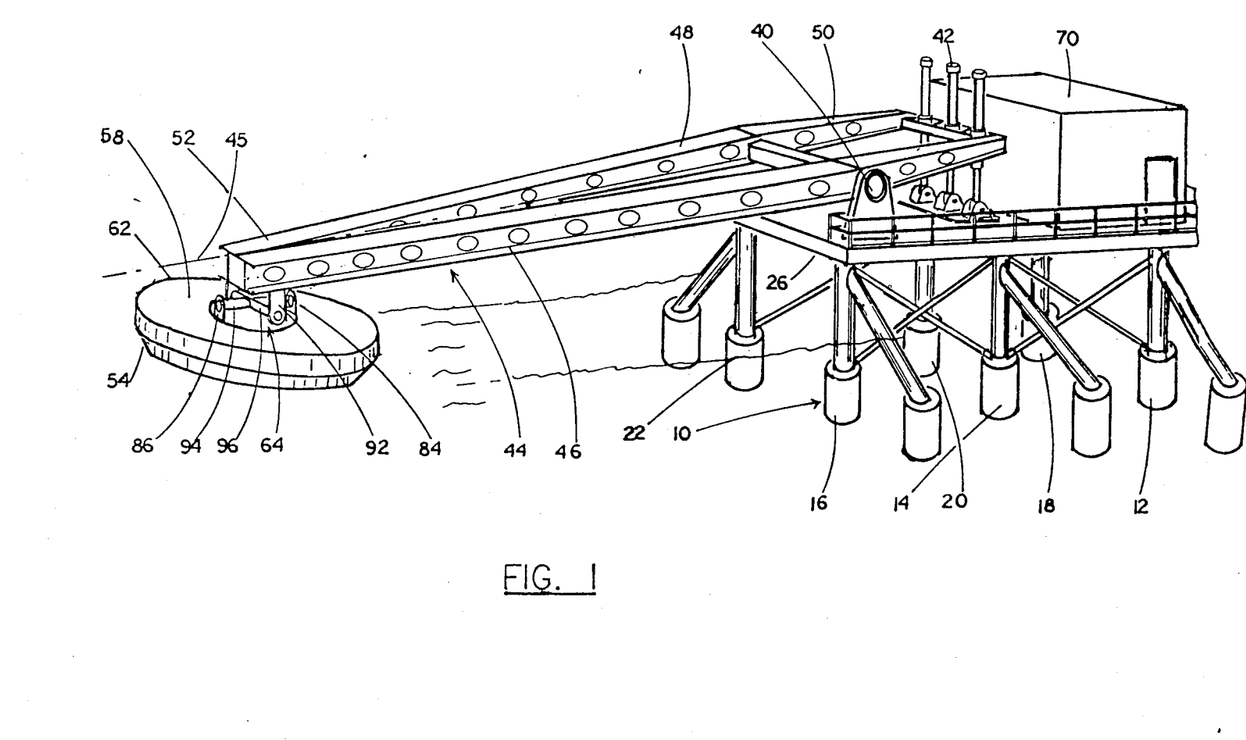
FIG. 1 is an isometric view of the apparatus for generating electrical energy from wave motion.
Figure 2:
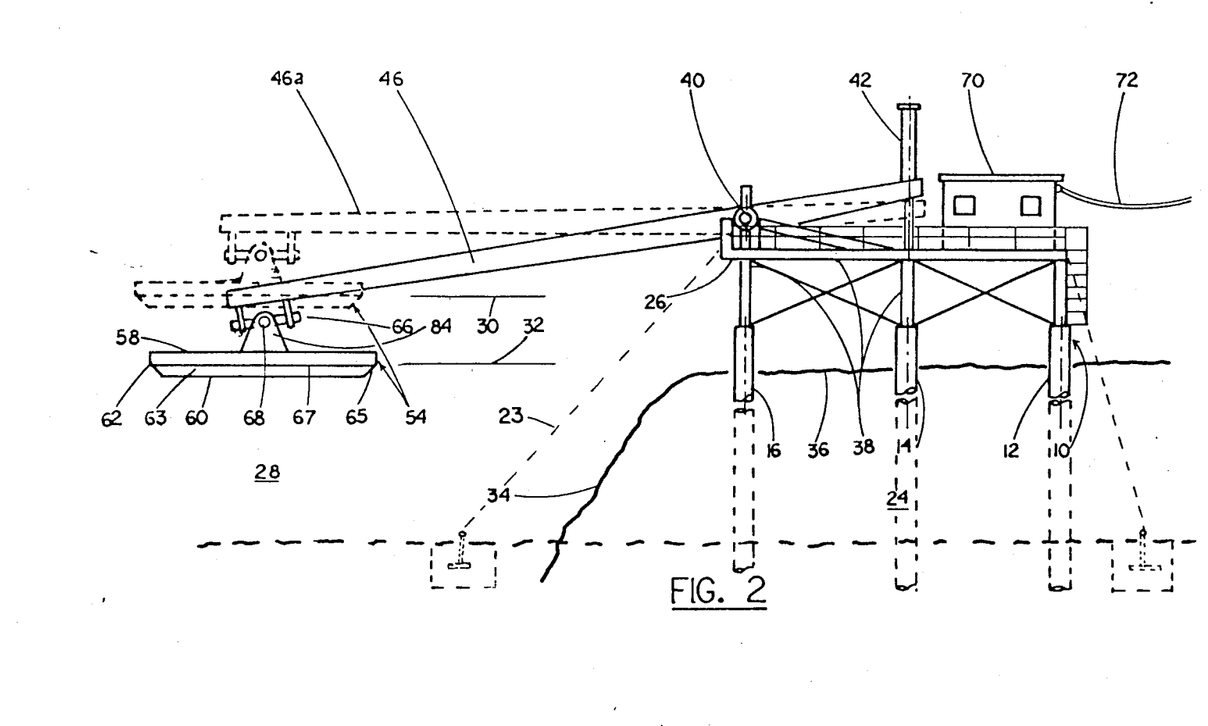
FIG. 2 is a side elevation view of the apparatus of FIG. 1 and shows the device supported from a reef.

Attention is now directed to FIGS. 1 and 2 which shows the preferred embodiment of my generating apparatus using wave motion. Shown thereon is a platform 10 having columns 12, 14, 16, 18, 20 and 22. Anchored installation lines 23 ar provided. these columns are supported from reef 24 which is covered by water 28 having a high water line (HWL) 30 and a low water line (LWL) 32. As shown in FIG. 2, reef 24 has a reef edge or cliff 32 which provides a sudden drop off so that the water to the left of the cliff 34 is much deeper than it is on the top 36 of the reef 24. The device of this invention is particularly adapted for this tupe ocean terrain.

Figure 3:
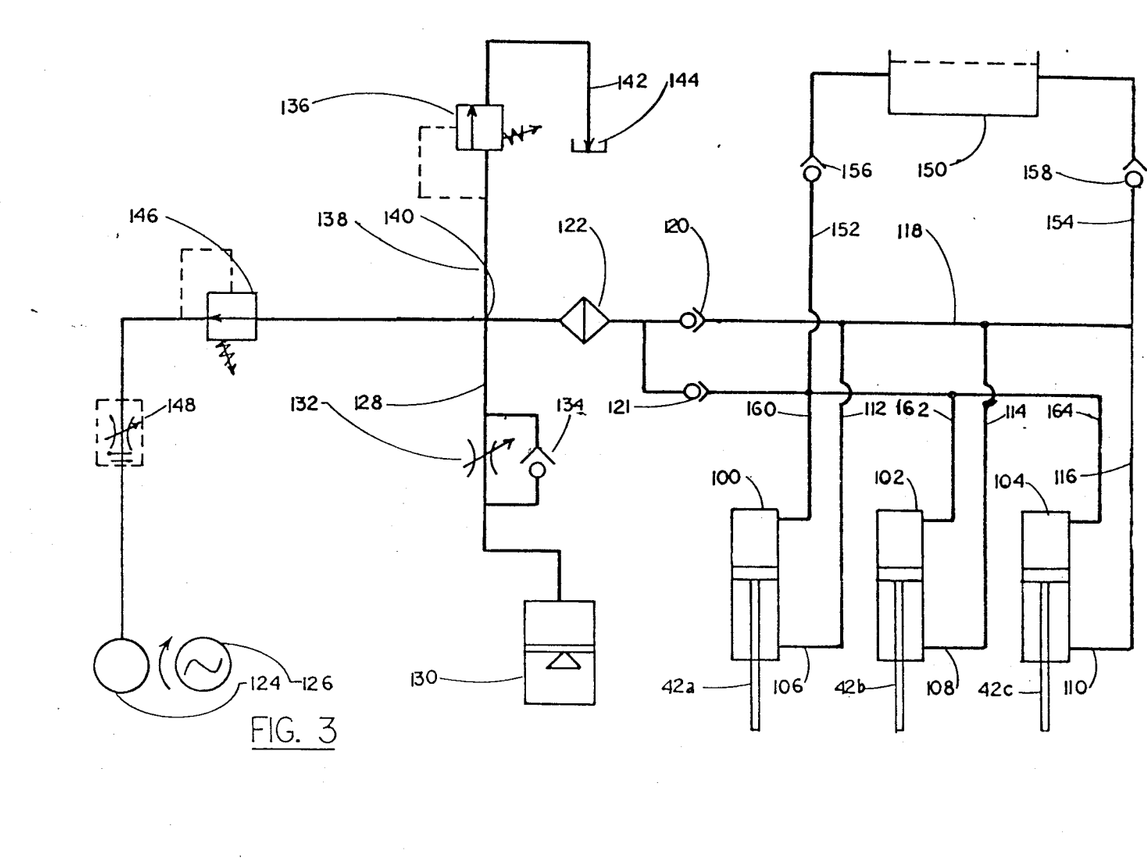
FIG. 3 illustrates a generalized hydraulic or fluid flow diagram.

The support columns are secured together by proper structure 38. A deck 26 is provided on top of the support columns and is above the high water line 30. Supported by the support columns is a pivot 40 which is mounted between support columns 16 and 22. A plurality of hydraulic cylinders are supported between support columns 14 and 20. Any desired number can be utilized although only three are shown. Features of the hydraulic fluid or fluid flow diagram using the hydraulic or fluid cylinders 42 are shown in FIG. 3 and will be discussed hereinafter. Beam 44 comprises float arms 46 and 48. This beam has a first end 50 adjacent the hydraulic or fluid cylinders 42 and a second end 52 which is connected to float 54. The float arms 46 and 48 are connected to pivot 40 which is supported between columns 16 and 22.

Buoyant float 54 is in the shape of a disc or plate having an upper surface 58 and a lower surface 60. The edge or side surfaces 62 are curved and are in the shape of a circle as clearly shown in FIG. 1. Float 54 is supported from the end of float arms 46 and 48 by a universal joint 64. Joint 64 is shown in detail in FIG. 4. As shown in FIG. 2 float arms 46 and 48 support a first axis 66 which is pivotally attached to the axis 68 which is supported at the center of float 54.

The platform will be built such that the axis 45 of beam 44 is generally aligned with the direction of travel of the waves of the water 28. Sometimes this is not possible and sometimes the waves change directions due to storms. The particular shape of the float 54 and the manner in which it is attached to float arms 46 and 48 compensate for those situations in which the wave travel may not be directly in line with the axis 45. If the waves, for example, are coming in perpendicular to axis 45 the device will still function. This is permitted because of the shape of the float 54 and the universal connection between the float 54 and the float arms 46 and 48. Because of the round shape of the float 54 and the universal action of the pivot it doesn't matter which way the waves come because there is no flat side to the float and because of the type pivotal connection, the required pivotal action is obtained between the float 54 and the float arms 46 and 48.

A hydraulic or fluid power means and electrical generating equipment are in building enclosure 70 which is mounted on deck 26. Electrical transmission lines 72 convey the generated electricity to shore for further transmission. The hydraulic flow diagram is shown in FIG. 3.

In operation of the device of FIGS. 1 and 2 when a wave passes by float 54, the float will move up and down. As it does it will force the float arms from the solid line position to the dashed line position shown as 46a shown in FIG. 2. As the arms 46 and 48 move up and down they actuate the hydraulic or fluid cylinders 42 to provide hydraulic fluid or fluid under power to the hydraulic or fluid equipment in building 70 which is used to run the electrical generating equipment to generate electricity.

Figure 5:
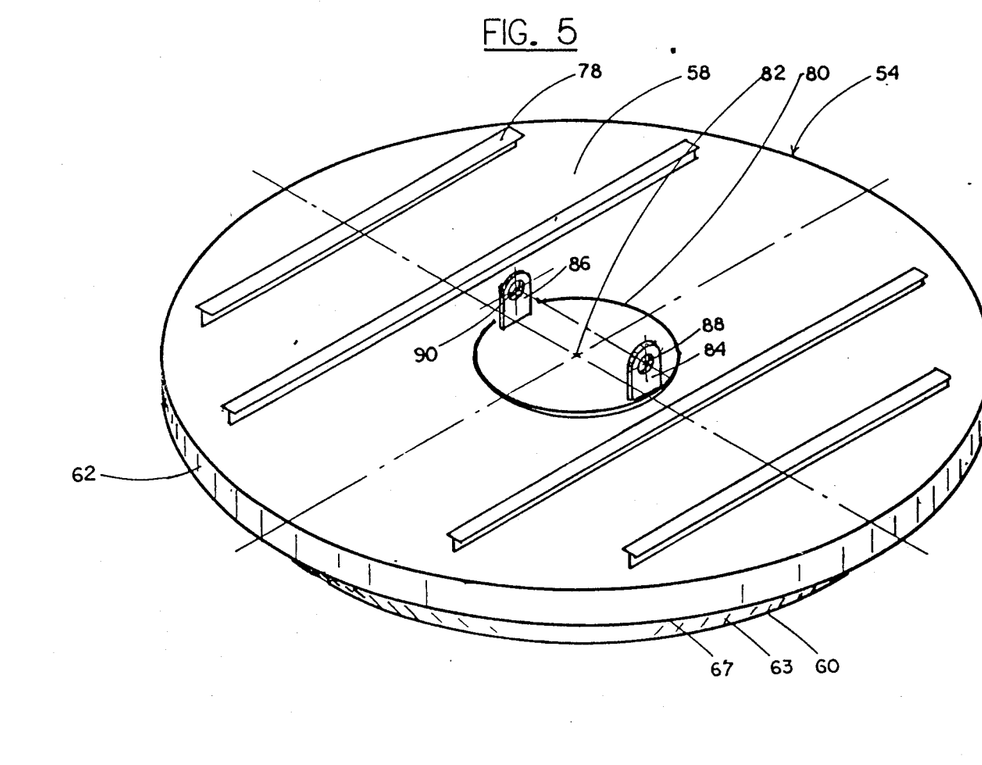
FIG. 5 shows an enlarged view of the circular float.

Attention is next directed to FIG. 5 which shows an enlarged view of the circular float 54. It generally takes the shape of a very short "fat" cylinder in which the height is very small compared to the diameter, typically this would be a preferred range of ratio of about 1:5 to 1:10, with the preferred ratio being about 1:8. As shown in FIG. 2 the float has an upper face 58 and a lower face 60. The lower face 60 is of slightly smaller diameter than upper face 58 so that there is a sloping surface 63 between cylinder dge 62 and bottom 60. As shown in FIG. 2 the edge line 65 which represents the edge 63 makes an angle of about forty-five degrees with the connecting line 7 between the base of upper cylinder 62 and line 65. Base 58 is provided with reinforcing members 78 to give the float rigidity. The float may be made of any suitable material which is corrosion resistance to the sea water and which is sufficiently strong for the job. These materials may, for example, be steel, stainless steel or reinforced plastic. A reinforcing plate 80 which is preferably circular is secured to plate 58 by any acceptable means such as welding and is positioned at the center 82 of the circular plate 58. The reinforcing plate 80 has two spaced apart parallel ears 84 and 86 having aligned holes 88 and 90.

Figure 4:
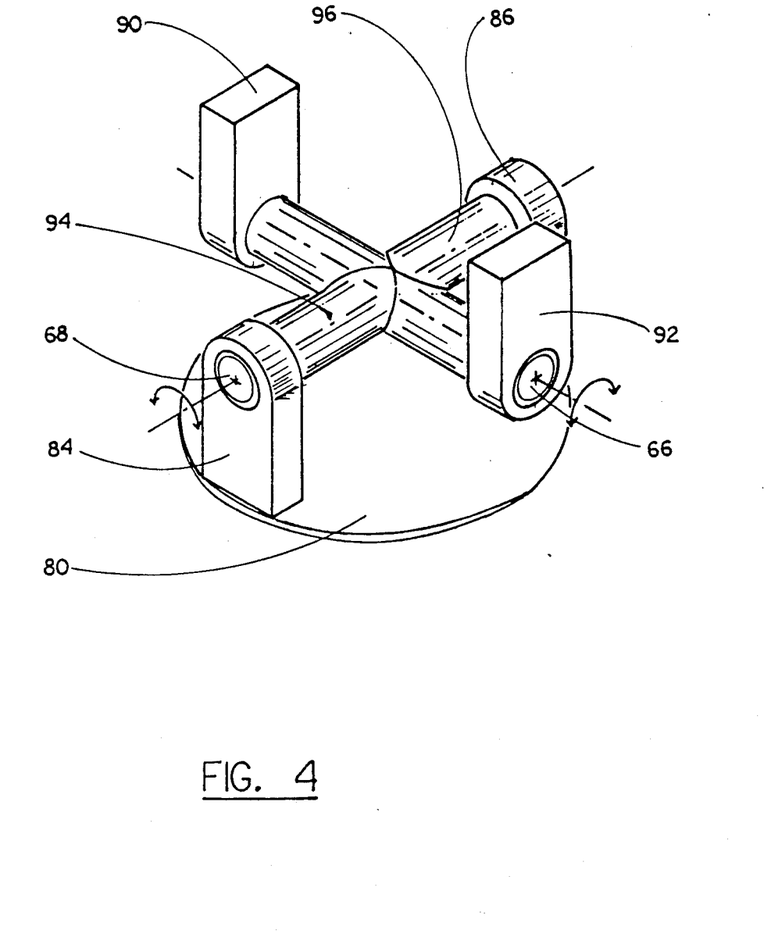
FIG. 4 shows a universal connection for connecting the float to the boom.

Attention is next directed to FIG. 4 which shows the universal connection between the float 54 and the balloon 44. Ears 84 and 86 are attached to reinforcing anchor plate 80. There are shown ears 90 and 92 which are attached to the boom 44. Cross shafts 94 and 96 are provided with shaft 94 with axis 68 rotatably mounted in ears 84 and 86 and shaft 96 with axis 66 rotatably supported in ears 90 and 92. There is thus provided the universal type connection between the float 54 and the boom 44. This connection is critical inasmuch as it permits the float and boom to operate efficiently no matter which way the waves may be coming in toward the position of the float. If the waves are coming directly in toward the float on the direction of the longitudinal axis of boom 44 then the float can rotate on axis 96. If the direction of the waves changes where it comes in perpendicular to the beam 44 then the float can rotate on axis 94. The circular configuration of the float together with the universal connection just described permits the boom system to work without regard as to which direction from which the waves may come. This then insures a continuous supply of generating capacity even in storms which may cause the waves to shift directions drastically.

Attention is next directed to FIG. 3 which shows a simplified hydraulic or fluid flow diagram. Shown thereon are hydraulic or fluid pumps 100, 102, 104, although any number of pumps may be employed. These pumps each have a piston rod 42A, 42B, and 42C which are connected to the rigid boom 44 as indicated at 42. The upward and downward movement of float 54 causes boom 44 to rotate about shaft 56 thus driving rods 42A, 42B and 42C in a reciprocating manner. Each hydraulic or fluid cylinder has a power outlet 106, 108, and 110 which flows through lines 112, 114 and 116, respectively, to line 118 which is connected through check valve 120 through filter 122 to drive hydraulic or fluid motor 124 which drives generator 126 to generate electricty which is fed outwardly toward the land on electrical transmission line 72 as shown in FIG. 2. Line 118 is connected to line 128 which is connected to an accumulator or fluid pressure container 130. There is a control valve 132 in line 28 connected in parallel to a check valve 134. A relief valve 136 is in line 138 which connects to line 128 and 118 at junction 140. The output of relief valve 136 is connected through line 142 to an overflow collecting means 144. Line 118 is connected to a pressure reducing valve 146 whose output is connected to a special flow control valve 148 whose output is connected to the hydraulic motor 124. The spent hydraulic fluid or fluids from hydraulic or fluid motor 124 is returned by lines not shown to hydraulic or fliud reservoir 150 which is connected respectively through lines 152 and 154 to cylinders 100 and 104. Lines 152 and 154 have check valve 156 and 158 which permits fluid to flow only from the hydraulic fluid or fluid reservoir in the direction of the piston 100, 102 and 104.

On the downward strokes of rods 42A, 42B and 42C fluid flows from hydraulic or fluid reservoir 150 through lines 52, through lines 160, 162 and 164 to the top side of cylinders 100, 102 and 104. Power fluid then flows out lines 106, 108, 110 through line 118 through check valve 120 on through filter 122 to the hydraulic or fluid motor 124. On the reversion of directions of rods 42A, 42B and 42C, power fluid flow is out lines 160, 162 and 164 through check valve 121, flow to filter 122, on to hydraulic or fluid motor 124. During this time fluid cannot flow back to the hydraulic or fluid reservoir because of check valves 156 and 158. During this stroke just defined, hydraulic fluid or fluid flows from reservoir 150 through check valve 158, line 154, lines 112, 114 and 116 to the lower side of the pistons in cylinders 100, 102 and 104. there is thus an endless supply of energy from the waves to continually drive the hydraulic fluid or fluid pumping cylinders to provide hydraulic power or fluid power for hydraulic or fluid motor 124 continually operates generator 126 to provide electricity on a continuous basis.

Figure 6:
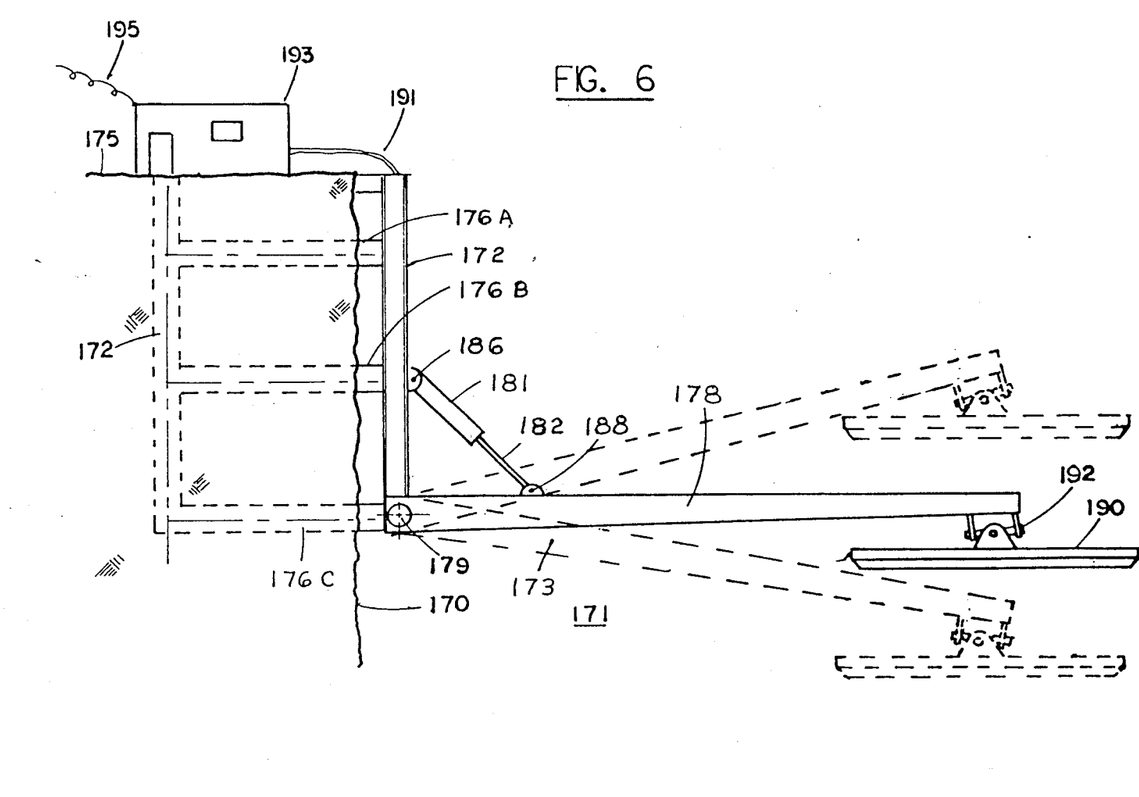
FIG. 6 shows an apparatus for generating electrical energy from wave motion and mounted in an environment inwhich an essentially vertical cliff extends above the water.

Sometimes it may be desirable to generate electricity from waves which are in an environment in which there is a nearly vertical cliff against which the waves may pound. An embodiment of my invention suitable for installation in such an environment is shown in FIG. 6. Shown thereon is a body of water 171 which abuts a cliff 170 which has a top 175. A rigid vertical support column 172 is provided adjacent the face of cliff 170. This is held in position by horizontal members 176A, 176B and 176C which are embedded in the cliff wall and are connected to a vertical stability member 174. A rigid beam 178 which may be similar to beam 44 of FIG. 1 is attached to vertical member 172 at pivot 179. A float 190 is attached to rigid beam 178 by universal joint 192. Float 190 and universal joint 192 is built in accordance with the description given above in regard to float 54 and universal joint 64. A hydraulic pump has housing 180 attached at pivot 186 to vertical column 172 and an extension rod 182 is connected through pivot 188 to the rigid beam 178. Cylinder 180 serves the same purpose and function as that of hydraulic or fluid cylinders 42 of FIG. 2. As the waves move the float 190 up and down to the position shown in dashed lines, hydraulic or fluid cylinder 180 generates hydraulic fluid or fluids under pressure which extends through flow lines 191 to an electric generator inside building 193 and the power generated is transferred inland by conductors 195. Power will be generated similar to that described above in regard to FIGS. 1 and 2.

Figures 7, 8:
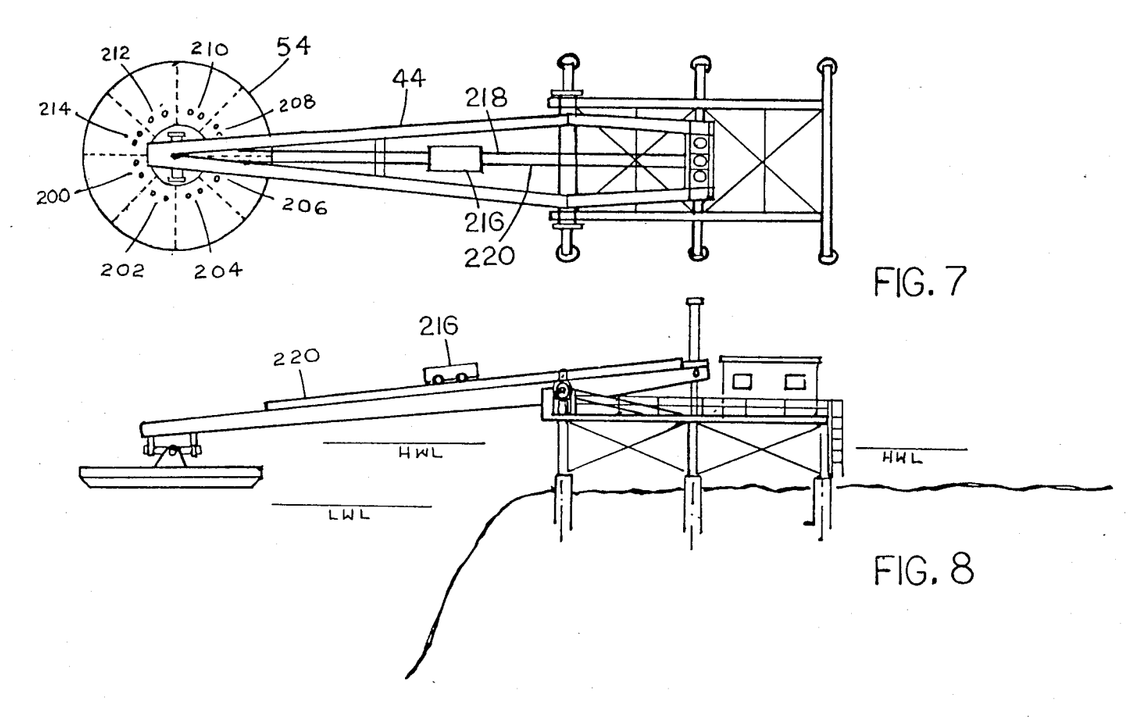
FIG. 7 shows a top view of the apparatus of my invention in which there are means provided to modify the ballast and the location thereof.
FIG. 8 is a side view of the apparatus of FIG. 7.

Attention is next directed to FIGS. 7 and 8 which shows means for modifying the ballast and having resonant control. The efficiency of the wave energy system will be highest if I have a resonant system tuned to the frequency of the waves. This system is a resonant system and by using mass, by adding mass and position and using well known natural frequency formulas, the system can be tuned to any wave period by changing the system mass and distribution. FIGS. 7 and 8 are ballast systems showing how the mass can be changed. This includes (1) a float water ballast system and (2) an adjustable ballast car. The float in FIG. 7 is shown as being divided into eight compartments 200, 202, 204, 206, 208, 210, 212, and 214. Any convenient number of floats can be used, although eight are shown. Each compartment is provided with an inlet hose and an outlet hose. This is illustrated in compartments 208, 210, 212 and 214 in which each has a hose bundle providing for an inlet and an outlet so that water can be pumped in or pumped out of any selected compartment. By pumping water in or out one can change the system mass.

In order to increase the range of change which can be obtained, I have an adjustable ballast car 216 which is mounted on wheels for extending along rails 218 and 220. The position of the ballast car 216 along rail 220 can be controlled by any convenient means such as a cable or drive screw (not shown). I can also change the amount of mass of the ballast care 216. The distance of the ballast car from the arm pivot is used in determining the system mass and the system resonant frequency. By using the float water ballast system and adjustable ballast car just described, I can obtain a resonant system which can be tuned to any of the wave periods. Thus, the efficiency of this wave energy system will be at its maximum by having a resonant system tuned to the frequency of the waves.

If the wind velocity or the wave heights, either or both, get too great, then the float should be either lifted out of the water to a top position about the waves or it should be placed below the surface of the water and preferably on the sea floor. A wind velocity sensor is provided on the platform supporting the equipment. When the velocity reaches a certain value, the rigid beam 44 will be locked in position so that the float is at its highest possible position. This can be accomplished by using hydraulic or fluid pumps 42 as jacks and when the float 54 has reached its uppermost position the hydraulic pump will be locked in position. This can be accomplished by closing off the input and the output lines such as lines 106 and 160 to the hydraulic pump 100 shown in FIG. 3. Hydraulic fluid or fluids from a source not shown can be injected into the upper side of cylinder 100 driving the piston rod 42A to its lowermost position which would drive the float to its highest position. When the float reaches this position the fluid is shut off to the hydraulic or fluid pump 100 and the piston is held in this position. When the storm is over so that the wave height is reduced, fluid is released from the hydraulic pump 100 and the valves in lines 106 and 160 are open for normal operation. One can also use the wave height to trigger the operation just described whereby the float will be raised to its highest position and locked therein. Means are also such that when the wind velocity reduces a preset level or the wave height reduces to a preset level, the hydraulic pump locking system will be deactivated and normal operations will resume. Another safety precaution is to lock the float 54 to the elongated beam 44. This can be accomplished by connecting a line to the top side of the float at its edge and running it over a pulley on the beam 44 and pulling up on the line until the float is in a fixed position against the rigid beam and holding the float at that position. When the storm conditions have subsided the float will be released.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for converting motion of water to usable energy which comprises:
    a platform supported by the earth and extending above the high water line of said water;
    a rigid beam having a first end and a second end;
    rails mounted on said rigid beam;
    a mass movable along said rails of said rigid beam so that a selected resonant frequency of the apparatus may be obtained;
    a pivot supported by said platform and pivotally supporting said beam at a point intermediate said first and second ends;
    at least one pump supported by said platform;
    connecting means connecting the first end of said beam to said pump so that movement of said beam operates said pump to produce fluid under pressure;
    a buoyant member, said buoyant member being divided into a plurality of compartments and including an inlet and an outlet means to add or remove fluid for each said compartment;
    a universal joint connecting said buoyant member to said second end of said beam;

said buoyant member is unrestrained except for said universal joint which is the only structural connection between said buoyant member and said beam; and power generating means operable by said fluid under pressure.

2. An apparatus as defined in claim 1 in which said buoyant member is cylindrically shaped and connects at the center to said universal joint.

3. An apparatus as defined in claim 1 in which said buoyant member is of a diameter and a height H in which the diameter is at least about eight times the height H and further the buoyant member is connected at its center to said universal joint.

4. An apparatus for converting a motion of water to usable energy in which the water is above a reef having a top with shallow water and a reef cliff which is the boundary of deep water which comprises:

- a platform supported by the top of said reef adjacent said cliff;
- a rigid beam having a first end and a second end, said second end extending beyond said cliff;
- rails mounted on said rigid beam;
- a mass movable along said rails of said rigid beam so that a selected resonant frequency of the apparatus may be obtained;
- at least one cylinder for producing power fluid based on movement of said rigid beam and supported by said platform;
- a pivot connecting an intermediate point between the ends of said rigid beam and the platform;
- first connecting means connecting the first end of said beam to said cylinders;
- a flat buoyant member having a center, said buoyant member being divided into a plurality of compartments and including an inlet and an outlet means to add or remove fluid for each said compartment;
- a second connecting member connecting the second end of said beam member to said buoyant member and in which said second connecting member is a universal connecting joint to accommodate wave motion in various directions and including wave motion travel perpendicular to the axis of said beam member;
- the apparatus has no structure under said buoyant member and said universal connecting joint is the only structural connection between said buoyant member and said rigid beam and said platform so that said buoyant member is otherwise unrestrained.

* * * * *